US 7,480,674 B2

(12) United States Patent
Venguerov

(10) Patent No.: US 7,480,674 B2
(45) Date of Patent: Jan. 20, 2009

(54) DATA STORAGE AND RETRIEVAL SYSTEM WITH PARAMETERIZED CATEGORY DEFINITIONS FOR FAMILIES OF CATEGORIES AND DYNAMICALLY GENERATED SEARCH INDICES

(75) Inventor: Mark Venguerov, Dun Laoghaire (IE)

(73) Assignee: PI Corporation, Kirkland, WA (US)

( * ) Notice: Subject to any disclaimer, the term of this patent is extended or adjusted under 35 U.S.C. 154(b) by 720 days.

(21) Appl. No.: 11/205,576

(22) Filed: Aug. 17, 2005

(65) Prior Publication Data

US 2006/0161579 A1 Jul. 20, 2006

Related U.S. Application Data

(63) Continuation-in-part of application No. 11/039,191, filed on Jan. 20, 2005, now Pat. No. 7,412,452.

(51) Int. Cl.
*G06F 17/30* (2006.01)
(52) U.S. Cl. ............................... 707/102; 707/3; 707/6; 707/100; 707/2
(58) Field of Classification Search .................. 707/102
See application file for complete search history.

(56) References Cited

U.S. PATENT DOCUMENTS

| | | | | |
|---|---|---|---|---|
| 7,096,465 | B1 * | 8/2006 | Dardinski et al. | 717/178 |
| 2003/0078777 | A1 * | 4/2003 | Shiau | 704/251 |
| 2003/0182274 | A1 * | 9/2003 | Oh | 707/3 |
| 2004/0111478 | A1 * | 6/2004 | Gross et al. | 709/206 |
| 2004/0227976 | A1 * | 11/2004 | Pavlov et al. | 358/1.18 |
| 2005/0044089 | A1 * | 2/2005 | Wu et al. | 707/100 |
| 2005/0182752 | A1 * | 8/2005 | Rojer | 707/2 |
| 2006/0206860 | A1 * | 9/2006 | Dardinski et al. | 717/105 |

* cited by examiner

*Primary Examiner*—Don Wong
*Assistant Examiner*—Binh V Ho
(74) *Attorney, Agent, or Firm*—David A. Dagg

(57) ABSTRACT

A data storage and retrieval system with parameterized category definitions and dynamically generated search indices. A parameterized category definition for a family of categories is obtained consisting of a parameterized predicate, such that parameter values can be provided with a search query to identify information items that match a category within the family of categories. The parameterized category definition is divided into a parameterized part and a static part. The static part is used to create associations between information items and the family of categories. The disclosed system processes the parameterized part of the category family definition to dynamically generate one or more search indices. The disclosed system determines whether any existing indices match the parameters of the parameterized part, and can accordingly be re-used. In the case where one or more indices are missing that are needed to support the parameterized part of the category family definition, the disclosed system operates to create them based on information items associated with the family of categories based on the static part of the parameterized category definition. Queries supplying values for the parameters of the parameterized category definition for the family of categories are subsequently processed to identify information items belonging to specific, dynamically defined categories within the family of categories.

9 Claims, 3 Drawing Sheets

DATA STORAGE AND RETRIEVAL SYSTEM WITH PARAMETERIZED CATEGORY DEFINITIONS FOR FAMILIES OF CATEGORIES AND DYNAMICALLY GENERATED SEARCH INDICES

CROSS REFERENCE TO RELATED APPLICATIONS

The present application is a Continuation in Part under 35 U.S.C. 120 of prior application Ser. No. 11/039,191, entitled "Data Storage and Retrieval System with Intensional Category Representations to Provide Dynamic Categorization of Information Items", filed Jan. 20, 2005, now U.S. Pat. No. 7,412,452 all disclosures of which are hereby included by reference herein.

FIELD OF THE INVENTION

The present invention relates generally to data storage and retrieval systems, and more specifically to a data storage and retrieval system with parameterized category families and dynamically generated search indices.

BACKGROUND OF THE INVENTION

As it is generally known, in the area of computer programs, many specific types of data storage and retrieval systems are currently available. For example, a database is a collection of information that is organized so that it can be conveniently accessed, managed, and updated. Databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Other specific types of databases are also available. A database manager often provides computer system users with the ability to control read/write access, specify report generation, and analyze usage. SQL (Structured Query Language) is an example of a standard language for making interactive queries from and updating a database.

In any specific type of data storage and retrieval system, it may sometimes be desirable to organize data items into categories. It may further be desirable that such categories be associated with category definitions of some kind or type. If information items are appropriately organized based on such definitions, system performance may be improved by such techniques as indexing of the information items, to provide search index data structures that improve the performance of search operations. However, due to their specific nature, not all categories of information items may be considered closed ended for purposes of definition, and therefore are not amenable to static category definitions.

For example, where there may be a need to provide category definitions for information item categories such as those representing or associated with appointments ranging over specific time periods. Such a situation may arise when categories would be helpful in determining appointment information items associated with any specific day, week, month, year, or other period of time. However, it may not be feasible to provide an exhaustive set of category definitions corresponding to all possible time periods. A solution in which discrete category definitions are established and maintained for every possible interval of time would result in an excessively high number of appointment categories. Alternatively, a limited number of such static category definitions may result in a system that is overly restrictive with respect to determining and/or collecting appointment information.

For the above reasons and others, it would be desirable to have a new system for information item categorization that does not rely on exhaustively defining all possible categories that may be needed. The new system should further allow for category definitions that can advantageously be used to provide improved system performance, such as through effective and efficient indexing of information items with regard to the category definitions.

SUMMARY OF THE INVENTION

To address the above described needs and others, a data storage and retrieval system with parameterized category definitions and dynamically generated search indices is disclosed. In the disclosed system, a parameterized category definition is obtained that defines a family of categories, for example from an application program or user. The parameterized category definition consists of a parameterized predicate, which may be embodied as a software routine or software routine with a Boolean result. When parameter values are provided to a parameterized category definition, a category of information items can be identified that reflects those values. When supplied with such parameter values, the parameterized predicate for a family of categories provides a test for an information item to which the predicate is applied, the result of which indicates whether that information item is a member of a category within the family of categories that is dynamically defined by the parameter values.

The parameterized category definition for a family of categories may be converted into a conjunctive normal form logical representation or the like for convenient processing. Using such a logical representation, the parameterized category definition may then be divided into a parameterized part and a static part. The static part is used to create associations between information items and the family of categories defined by the parameterized category definition. The disclosed system processes the parameterized part of the parameterized category definition by analyzing it, and then searching for any existing indices that match the parameters of the parameterized part. If any such existing indices are located, they are re-used to support the parameterized part of the parameterized category definition. In the case where one or more indices are missing that are needed to support the parameterized part of the parameterized category definition, the disclosed system operates to create them. Such newly created indices may, for example, be created across those information items associated with the static part of the parameterized category definition. The disclosed system thus operates to index stored information items to associate them with the static and parameterized portions of the parameterized category definition, in order to effectively and efficiently establish associations between information items and the associated family of categories.

During query processing, the disclosed system obtains a search query identifying a family of categories corresponding to a previously obtained parameterized category definition, and parameter values defining a category within that family of categories. The parameter values and previously established indices for the parameterized portion of the parameterized category definition are used to determine the set of information items in a "virtual category" of information items within the family of categories. The set of information items in the virtual category may then be reduced based on other conditions in the search query in order to produce the search results.

Thus there is disclosed a new system for information item categorization that does not rely on exhaustively defining all possible categories that may be needed. The new system further allows for parameterized category definitions that can advantageously be used to provide improved system performance through effective and efficient indexing of information items.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
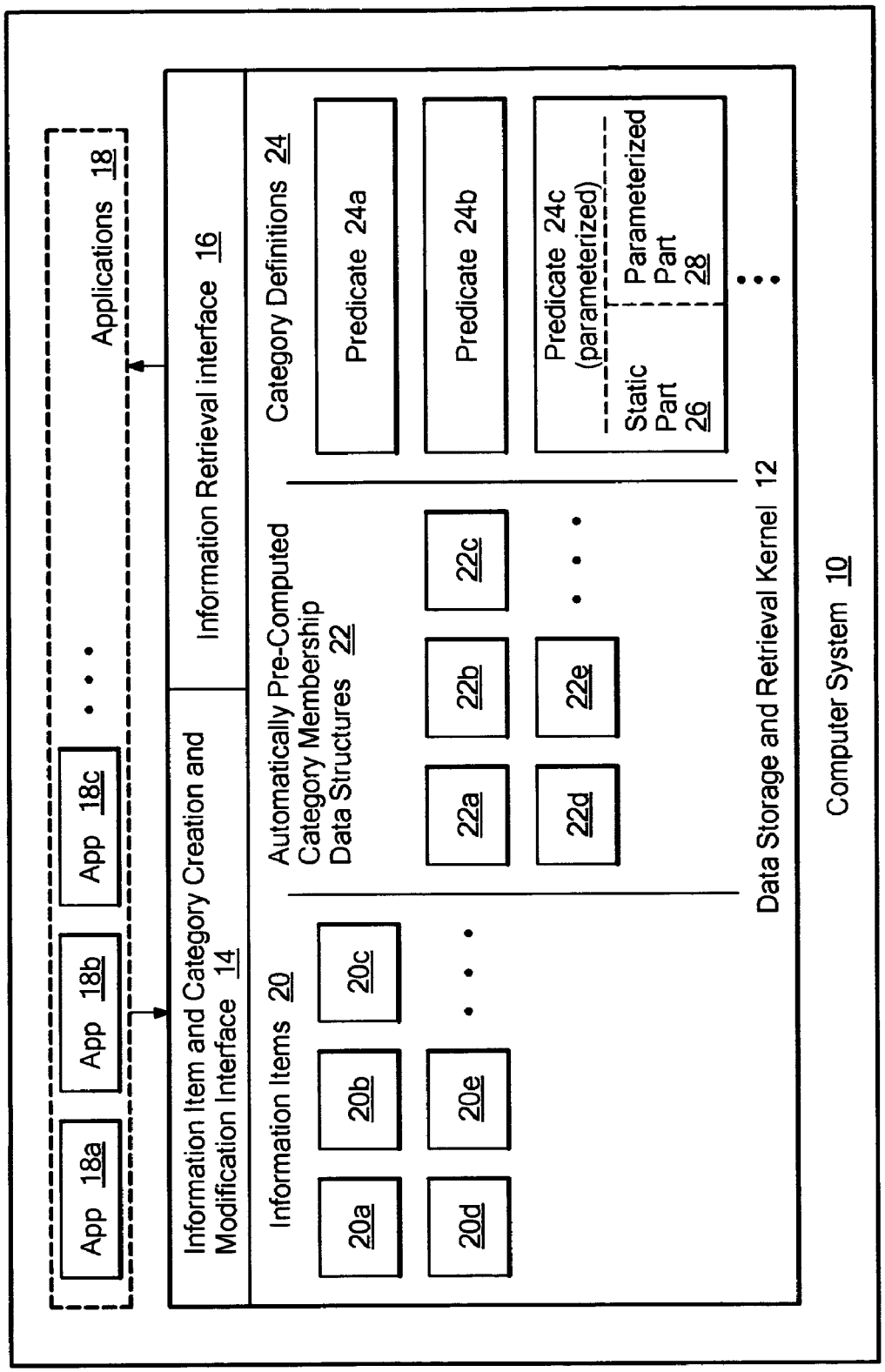
FIG. 1 is a block diagram illustrating components of an illustrative embodiment.

As shown in FIG. 1, software components in an illustrative embodiment of the disclosed system include a data storage and retrieval kernel 12 executing on at least one computer system 10. The data storage and retrieval kernel 12 is shown including an information item and category creation and modification interface 14 and an information retrieval interface 16. The interfaces 14 and 16 are accessible, for example, by way of application program interfaces (APIs), to one or more application programs, shown for purposes of illustration as applications 18 including applications 18*a*, 18*b*, 18*c*, etc. The computer system 10 may include at least one processor, program storage, such as memory, for storing program code executable on the processor, and one or more input/output devices and/or interfaces, such as data communication and/or peripheral devices and/or interfaces. The computer system 10 may further be embodied as one or more physically distributed computer systems, such as one or more client and server computer systems, that are communicably connected by a data communication system, such as a Local Area Network (LAN), the Internet, or the like. The computer system 10 may further include appropriate operating system software.

As further shown in FIG. 1, the data storage and retrieval kernel 12 includes a number of information items 20, a number of category definitions 24, and a number of automatically pre-computed category membership data structures 22. In a preferred embodiment, the information items 20 and category definitions 24 are stored separately, in that they are logically independent, and the category definitions 24 maintain no references (e.g. pointers) to or identifications (e.g. names) of the information items they designate as members of the respective categories that they define.

Advantageously, the structures of specific information items within information items 20 may be highly variable. First, different ones of the information items 20 may include different numbers of properties having associated values. Thus the information items 20 may each have different numbers of properties. Additionally, the number of properties for a given one of the information items 20 may change over time. Information items in a preferred embodiment include some number of properties, each of which has a corresponding value. Values of information item properties may also change dynamically.

The information items 20 may include any specific types of information. In one embodiment, the information items 20 include personal information maintained by individuals themselves during and/or for their general, daily, and/or professional activities, and the properties of each of the information items 20 may accordingly include corresponding personal information properties. Such personal information properties may, for example, include various types of contact information, such as postal addresses, electronic mail addresses, telephone numbers, persons' names, and any other type of contact information. Personal information properties may further include information regarding personal activities, to do lists, schedule information including appointment dates and times, and any other type of personal information. The preceding examples of personal information properties are given only for purposes of explanation, and the disclosed system is not so limited. Accordingly, the disclosed system may be implemented in embodiments using any other specific type of personal information, or any other non-personal information.

The category definitions 24 may be provided by applications 18 at run time. Each of the category definitions 24 consists of, includes or is associated with a predicate, which may be embodied as a software routine or software routine with a Boolean result. The predicate for a category provides a test for an information item to which the predicate is applied. If an information item passes the test defined by the predicate of a category, then the information item is considered to be contained within the category, and an association may be formed between the information item and the category. In one embodiment, the disclosed system uses "intensional" category assignment, in that each category includes a predicate which, applied to an information item, logically returns true or false with respect to whether the information item belongs in that category. This approach is distinct from previous "extensional" approaches, which rely on information item identities and categories that include the information item lists. In traditional relational databases, only extensional categorization has been supported, represented by the table membership of the records in the database. Such existing systems have not supported testing of the contents of a record to determine which table it belongs to.

General definitions for "intensional definition" may be found in various sources. In the area of logic, an intensional definition gives the meaning of a term by giving all the properties required for something to fall under that definition—the necessary and sufficient conditions for belonging to a set being defined. One example of an intensional definition of "bachelor" is "unmarried man." This is because being an unmarried man is an essential property of something referred to as a bachelor. Being an unmarried man is a necessary condition of being a bachelor—one cannot be a bachelor without being an unmarried man. Being an unmarried man is also a sufficient condition of being a bachelor—any unmarried man is a bachelor. The intensional definition approach is opposite to the extensional definition approach, which defines by listing everything falling under a definition. Accordingly, an extensional definition of "bachelor" would be a listing of all the unmarried men in the world. In this regard, intensional definitions are best used when something has a clearly-defined set of properties, and work well for sets that are too large to list in an extensional definition. Moreover, it is impossible to give an extensional definition for an infinite set, but an intensional one can often be stated concisely. For example, while the infinite number of even numbers makes them impossible to list, they can be defined intensionally by saying that even numbers are integer multiples of two.

The predicates used in the category assignment process of the disclosed system advantageously provide intensional definitions for corresponding categories. Accordingly, each predicate of the disclosed system tests the properties of an information item to determine if that information item belongs to the category defined by the predicate. The intensional definition of categories in the disclosed system enables categorization of information items at run time, and accordingly allows information items to dynamically change their categorical membership. The disclosed system may operate to check information items at any time to determine whether they have changed category membership. Each category must accordingly at least include a category name and a predicate which can be applied to an information item to determine if the information item belongs to the category.

In the disclosed system, the category definitions 24 may include static predicates defining static categories, as well as parameterized predicates defining families of categories. Such parameterized predicates are examples of parameterized category definitions. In the case of a family of categories defined by a parameterized category definition, the categories contained within the family are defined when specific parameter values are provided at run time for the parameterized portion of the parameterized predicate. The predicates in the category definitions 24 of FIG. 1 are shown including a static predicate 24a, a static predicate 24b, and a parameterized predicate 24c. The parameterized predicate 24c is shown including a static part 26, as well as a parameterized part 28. Those skilled in the art will recognize that the disclosed system may be embodied using any specific number of category definitions.

The predicates for the category definitions 24 may each be satisfied by a different set of the information items 20. If one of the information items 20 satisfies any one of the predicates defining a category, it may be considered as belonging to the corresponding category for any processing or handling that might be associated with that corresponding category at any point during the processing of that information item. Additionally, if one of the information items 20 satisfies a predicate defining a category, then that information item can be included when all the members of the category are enumerated or otherwise processed at any point.

In the case of a parameterized predicate, such as predicate 24c, any determination of category membership for a given information item must be based in part on parameter values for the parameterized part 28. Thus categories of information items within a family of categories can be dynamically defined as needed at run time by combining the parameterized predicate for the family of categories with parameter values for the parameterized part of the parameterized predicate.

Automatically pre-computed category membership data structures 22 may be used to support information item retrieval operations performed through the information item retrieval interface 16, in order to provide better response times for queries, including those queries that may use category names or definitions as part of the query. In a preferred embodiment, the data structures 22 include one or more search index data structures that associate category names with ones of the information items 20 belonging to the corresponding categories. Such index data structures may be populated with information items by automatically applying predicates within the category definitions 24 to the information items 20, so that when a query is received indicating a category name, the members of that category within the information items 20 can be quickly identified using the index data structures.

In the case of a family of categories, indexing of the information items 20 can be performed in the same way, initially based on the static portion of the parameterized predicate. Thus the static portion of the parameterized category definition can be used to identify those information items that match the static portion of the parameterized category definition. Such information items are then associated with the family of categories for the parameterized category definition, and such associations maintained in the pre-computed category membership data structures 22. However, indexing based on the parameterized part is handled differently. As further described below, when a category family definition is obtained, the disclosed system analysis the parameterized part of the parameterized predicate. Based on this analysis, the disclosed system searches for an existing index that identifies information items within information items 20 having properties matching the parameterized part of the parameterized predicate.

For example, in the case where a family of categories is defined for meetings, a parameterized portion of the parameterized predicate defining it might include start time and end time parameters. Similarly, a family of categories might be defined for conference calls having start and end time parameters in a parameterized portion of its parameterized predicate. Another family of categories might also be defined for appointments, also having start and end time parameters in the parameterized part of its parameterized predicate, and so on. All such families of categories having start and end time parameters in their definitions can share an index structure within the automatically pre-computed category membership data structures 22 mapping specific values of those start and end time parameters to matching information items. In this example, the shared index structure would map specific start and end times to matching information items. Such a shared index may then be used in combination with index entries in the data structures 22 that are pre-computed based on the static parts of the parameterized predicates for the families of categories, in order to quickly identify information items that are members of dynamically defined categories within the families of categories.

In the case where there is no matching index for the parameterized part of a parameterized category definition, the disclosed system may operate to create an index for the parameterized part. Such an index for a parameterized part of a parameterized category definition may, for example, be created across those information items matching the static part of the same parameterized category definition, and stored in the data structures 22.

The data structures 22 may be created or modified automatically, synchronously or asynchronously, in response to the items or categories being created or modified via the information and category creation and modification interface 14. The information item and category creation and modification interface 14 also permits information items 20 to be created and/or modified dynamically, and independently permits categories to be created dynamically through the category definitions 24. The interface 14 may be embodied to allow information item creation and/or modification operations to be performed directly or indirectly by a user, for example in an embodiment where the disclosed system stores personal information for that user. Such user controlled actions may, for example, be provided through a graphical user interface (GUI) or the like associated with or provided by the interface 14, and/or provided by one of the applications

18. The interface 14 may also or alternatively allow information item creation and/or modification by software programs and/or processes external to the data storage and retrieval kernel 12. Such actions may, for example, be provided through an application programming interface (API) or the like associated with or provided by the interface 14.

In a preferred embodiment, item modifications are provided in two different ways, depending on how categories are configured. Synchronous categories require that item modification operations are reflected immediately in the results of any subsequent information retrieval operations. In this way, a category can be configured such that when an item modification affecting the membership of that category returns a completion status, all subsequent queries will return results that completely reflect that modification. Asynchronous categories do not require immediate consistency with the modifications in subsequent information retrieval operations.

The information retrieval interface 16 permits retrieval of information items 20 dynamically and independently from the categorization of the information items 20 based on the categories definitions 24. The interface 16 may be embodied to allow information item retrieval to be performed directly or indirectly by a user, for example in an embodiment where the disclosed system stores personal information for that user. Such user controlled actions may, for example, be provided by through graphical user interface (GUI) or the like associated with or provided by the interface 16, and/or provided by one of the applications 18. Information item retrieval through the interface 16 is accomplished in a preferred embodiment based on input information retrieval queries including one or more category names associated with corresponding ones of the category definitions 24. The information items returned in response to such queries reflect the categorization of information items 20 based on the ones of category definitions 24 indicated by the category names contained in such queries. The interface 16 may be embodied such that any specific query language, including but not limited to SQL (Structured Query Language) or extensions of SQL, or the like, may be used to indicate the information items to be retrieved. The interface 16 may also or alternatively allow information item retrieval by software programs and/or processes external to the data storage and retrieval kernel 12. Such actions may, for example, be provided through an application programming interface (API) or the like associated with or provided by the interface 16.

Figure 2:
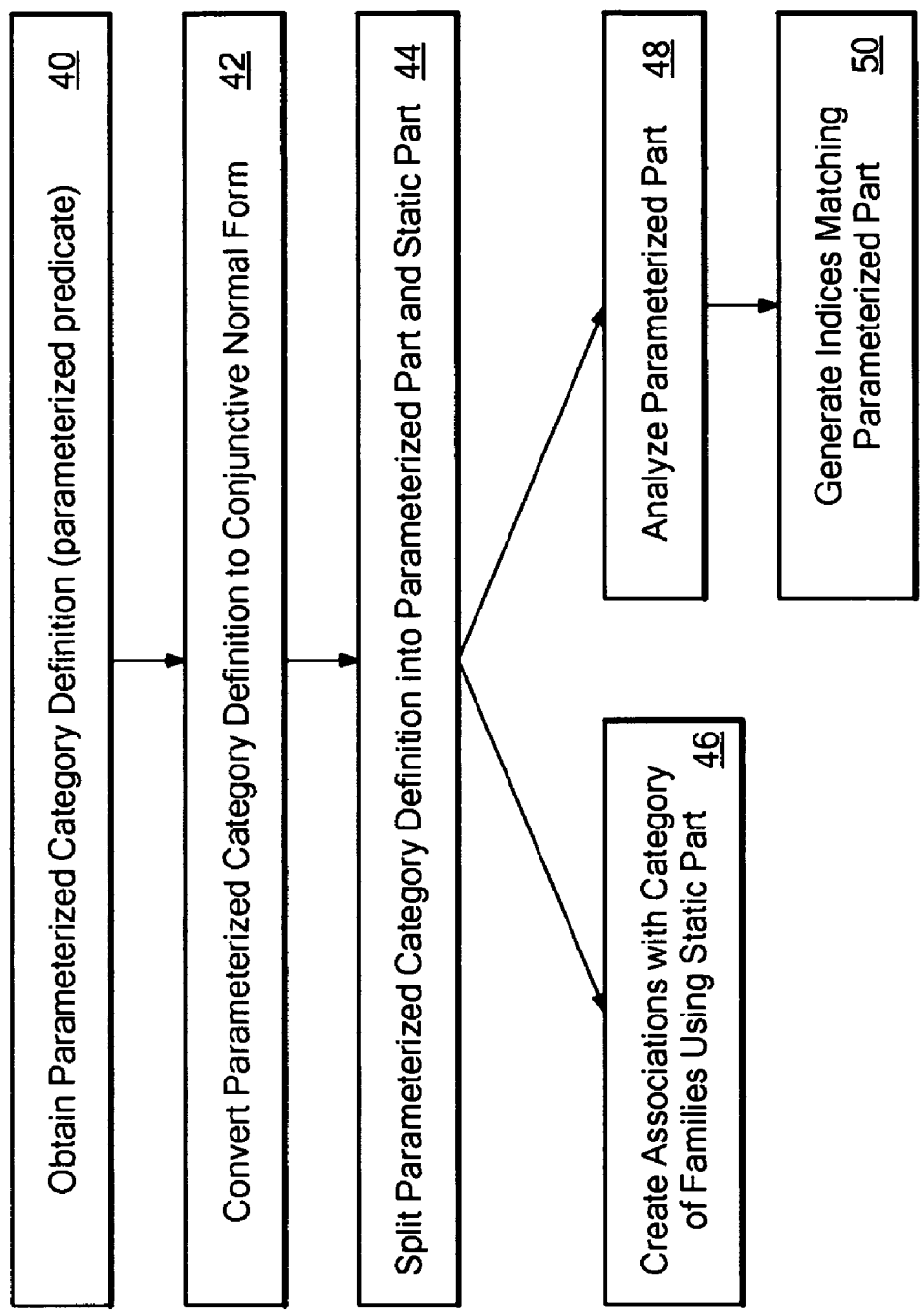
FIG. 2 is a flow chart illustrating steps performed to accomplish registration of categories in an illustrative embodiment.

FIG. 2 is a flow chart illustrating steps performed to accomplish category family registration in an illustrative embodiment. The steps of FIG. 2 may, for example, be performed by the data storage and retrieval kernel 12 of FIG. 1, in response to creation, receipt, modification or deletion of an information item category through the information item and category creation and modification interface 14.

At step 40, the disclosed system obtains a parameterized category definition, for example in the form of a parameterized predicate. At step 42, the parameterized category definition is processed as needed so that the parameterized part and the remaining static, part can be conveniently identified. For example, the parameterized category definition may be processed at step 42 by conversion to a logical organization such as conjunctive normal form. As it is generally known, a logic statement is in conjunctive normal form if it is a conjunction (sequence of logical ANDs) consisting of one or more conjuncts, each of which is a disjunction (logical OR) of one or more literals (i.e., statement letters and negations of statement letters). Examples of conjunctive normal form statements include:

(A OR B) AND ((NOT A) OR C)
A OR B
A AND (B OR C)

Such a conversion may be useful to organize the parameterized category definition so that at step 44 it can be split into a separate parameterized part and remaining static part. Based on the split performed at step 44, the disclosed system performs processing on the parameterized and static parts. At step 46, the disclosed system processes the static part of the parameterized predicate by creating associations between a name for the family of categories and information items that match the static part of the parameterized category definition. These associations define a set of information items associated with the family of categories. With regard to the parameterized part of the parameterized category definition, at step 48 the disclosed system analyzes it to determine the specific parameters for which values will subsequently be provided to dynamically determine category membership. At step 50, the disclosed system generates indices reflecting the parameterized part that are used to speed up subsequent searches. In this regard, within step 50, a set of existing index data structures are searched for any that match one or more of the parameters in the parameterized part of the category family definition. For example, if the parameterized part of the category family definition includes start time and end time parameters, then the search at step 50 would be for any existing index data structures mapping information items having start time or end time properties to specific start time or end time values. Any existing indices matching the parameters in the parameterized part are then associated with the name of the family of categories for subsequent use in processing queries. In this way the disclosed system provides for sharing of indices across families of categories that have portions of their parameterized category definitions in common.

If there are portions of the parameterized part that do not match any existing indices, at step 50 the disclosed system creates the necessary indices. For example, those information items associated with the category of families using the static part of the parameterized category definition may be indexed based on some or all of the parameterized part of the parameterized category definition to form such necessary indices. In this way, the disclosed system may avoid indexing the complete set of all existing information items to form such necessary indices.

Figure 3:
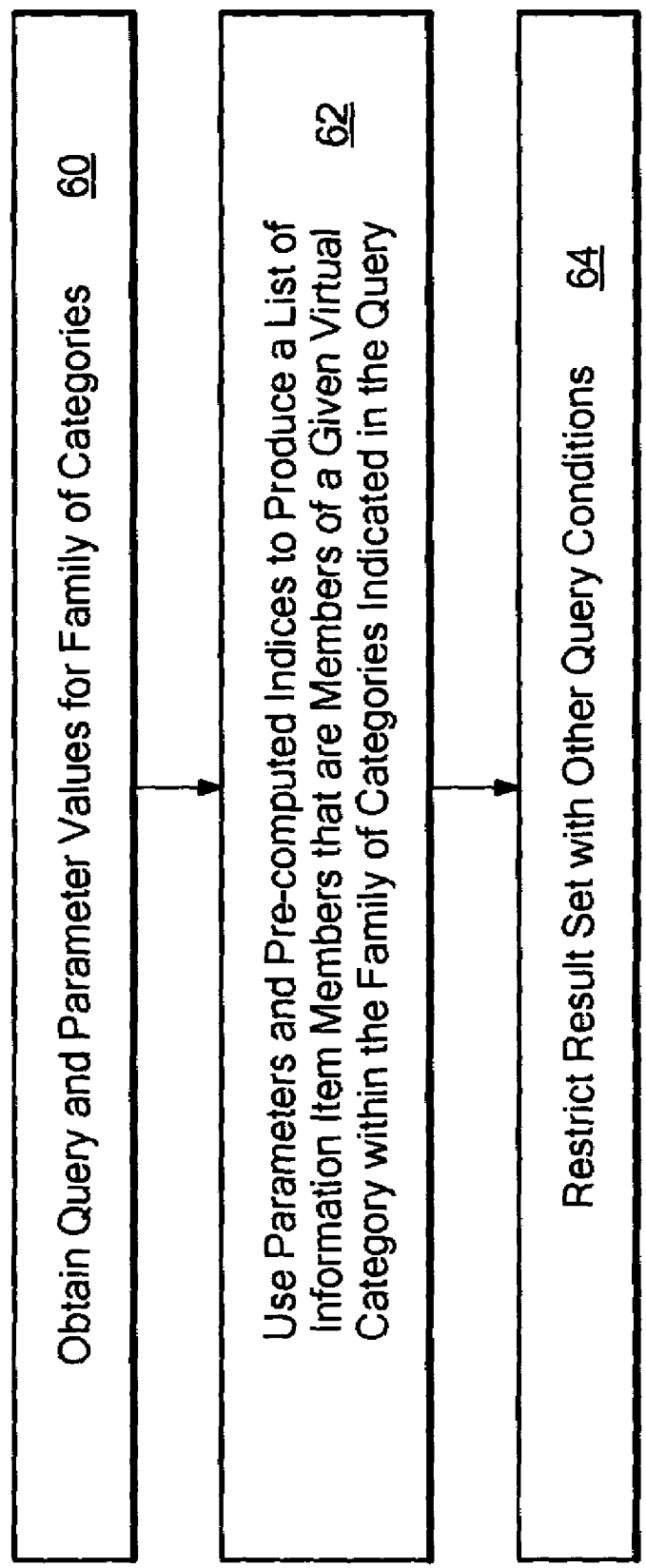
FIG. 3 is a flow chart illustrating steps performed to process a query including an indication of a family of categories in an illustrative embodiment.

FIG. 3 is a flow chart illustrating steps performed to process a query using category families in an illustrative embodiment. For example, the steps of FIG. 3 may be performed by the data storage and retrieval kernel 12 in response to a search query including a category family name and parameter values through the information retrieval interface 16. At step 60, the disclosed system obtains the search query including a category family indication, such as a category family name, and parameter values for identifying a specific category within that family of categories. For example, a query might indicate the family of categories for appointments having a name "Appointments", and indicate a start time parameter value indicating a first day and time, and an end time parameter value indicating a second day and time. At step 62, the disclosed system uses the parameters obtained at step 60 with the index data structures associated with the family of categories to identify and list information items that are members of a "virtual" category family dynamically defined within the family of categories by the parameter values provided in the search query. For example, the disclosed system might generate a list all information items representing Appointments that are scheduled between the first day and time and the second day and time parameter values. At step 64, the list of information items generated at step 62 is restricted according to any other query conditions within the query obtained at step 60. For example, the information items listed at step 62 may be reduced to the set of Appointment information items within the specified time range, and only relating to a specific subject matter also indicated in the query obtained at step 60.

Those skilled in the art will recognize that the disclosed system may be embodied in various specific ways to provide many significant advantages. First, any application may operate using or based on the dynamic categorizations provided by the disclosed system. For example, in one embodiment, a search application or tool may operate to perform searches and apply rankings of the search results based on categorizations of information items provided by the disclosed system. In such an embodiment the search tool might respond to a search query by searching only for information items belonging to some combination of categories defined by the category definitions 24 of FIG. 1.

Additionally, any specific intensional definition can be used in the predicates for the category definitions of the disclosed system. For example, a predicate may test an information item for the existence in an information item of all properties in a set of one or more properties. Or, a predicate may test an information item for the presence of at least one property within a set of properties. Another type of predicate may test the cardinality of certain properties. Such a predicate may test whether an information has a specific property, and whether the information item has some predetermined number of values for that property. If the information item does not have the predetermined number of values for the property, then such a predicate is not satisfied.

The disclosed system may further include value-based predicates, which test for certain property values. Value-based predicates may test any specific property for any specific value. For example, these predicates may test whether a Boolean property has a true or a false value, whether a zip code property has a certain zip code value, whether a price property has a value between a minimum and a maximum price, whether a date property is between a starting date and an ending date, etc.

Another type of predicate that may be used in an embodiment of the disclosed system tests one or more referential properties of an information item. These predicates test whether a value of a property is a reference (e.g. pointer) to another information item belonging to a specified category or set of categories.

The above described predicate examples are given for purposes of explanation only, and those skilled in the art will recognize that the disclosed system is not limited to those specific types of predicates, and that other types of predicates may readily be used in the alternative or additionally.

FIGS. 1-3 are block diagram and flowchart illustrations of methods, apparatus(s) and computer program products according to an embodiment of the invention. It will be understood that each block of FIGS. 1-3, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures. Accordingly, the invention should not be viewed as limited except by the scope and spirit of the appended claims.

I claim:

1. A method of providing categories for information items stored in an information storage and retrieval system, comprising:

obtaining a parameterized category definition for a family of categories;

logically separating a parameterized part of said parameterized category definition from a static part of said parameterized category definition, wherein said parameterized part includes a parameterized predicate, wherein said parameterized predicate, in combination with a set of dynamically obtained parameter values for said parameterized part, provides a test for an information item to which said parameterized predicate is applied, the result of which indicates whether said information item is a member of a dynamically defined category defined by said parameterized category definition and said parameter values;

associating those of said information items matching said static part of said parameterized category definition with said family of categories;

generating at least one search index associating those of said information items associated with said family of categories and having properties matching said parameterized part of said parameterized category definition with parameter values for said parameterized part of said parameterized category definition, including dynamically creating said at least one search index by, at least in part, indexing said information items associated with said family of categories to determine which of said information items associated with said family of categories match said parameterized Dart of said parameterized category definition;

obtaining a search query including an indication of said family of categories and parameter values for said parameterized part; and determining, responsive to said indication of said family of categories, said parameter values of said parameterized part, and said at least one search index, which of said information items match said search query.

2. The method of claim 1, wherein said generating said at least one search index comprises identifying one or more existing search indices matching at least a portion of said parameterized part of said parameterized category definition and sharing said existing search indices with another family of categories.

3. The method of claim 1, wherein said obtaining said parameterized category definition comprises obtaining said parameterized category definition at run time from a separate application program.

4. The method of claim 1, farther comprising:
converting said parameterized predicate into a conjunctive normal form logical representation; and
dividing said parameterized predicate into a static part and a parameterized part.

5. A system including a computer readable storage medium, said computer readable storage medium having a computer program stored thereon for providing categories for information items stored in an information storage and retrieval system, said computer program comprising:
program code for obtaining a parameterized category definition for a family of categories;
program code for logically separating a parameterized part of said parameterized category definition from a static part of said parameterized category definition, wherein said parameterized part includes a parameterized predicate, wherein said parameterized predicate, in combination with a set of dynamically obtained parameter values for said parameterized part, provides a test for an information item to which said parameterized predicate is applied, the result of which indicates whether said information item is a member of a dynamically defined category defined by said parameterized category definition and said parameter values;
program code for associating those of said information items matching said static part of said parameterized category definition with said family of categories;
program code for generating at least one search index associating those of said information items associated with said family of categories and having properties matching said parameterized part of said parameterized category definition with parameter values for said parameterized part of said parameterized category definition, including dynamically creating said at least one search index by, at least in part, indexing said information items associated with said family of categories to determine which of said information items associated with said family of categories match said parameterized part of said parameterized category definition;
program code for obtaining a search query including an indication of said family of categories and parameter values for said parameterized part; and program code for determining, responsive to said indication of said family of categories, said parameter values of said parameterized part, and said at least one search index, which of said information items match said search query.

6. The system of claim 5, wherein said program code for generating said at least one search index comprises:
program code for identifying one or more existing search indices matching at least a portion of said parameterized part of said parameterized category definition; and program code for sharing said existing search indices with another family of categories.

7. The system of claim 5, wherein said program code for obtaining said parameterized category definition comprises program code for obtaining said parameterized category definition at run time from a separate application program.

8. The system of claim 5, further comprising:
program code for converting said parameterized predicate into a conjunctive normal form logical representation; and
program code for dividing said parameterized predicate into a static part and a parameterized part.

9. A computer program product including a computer readable storage medium, said computer readable storage medium having stored thereon a computer program for providing categories for information items stored in an information storage and retrieval system, said computer program comprising:
program code for obtaining a parameterized category definition for a family of categories;
program code for logically separating a parameterized part of said parameterized category definition from a static part of said parameterized category definition, wherein said parameterized part includes a parameterized predicate, wherein said parameterized predicate, in combination with a set of dynamically obtained parameter values for said parameterized part, provides a test for an information item to which said parameterized predicate is applied, the result of which indicates whether said information item is a member of a dynamically defined category defined by said parameterized category definition and said parameter values;
program code for associating those of said information items matching said static part of said parameterized category definition with said family of categories;
program code for generating at least one search index associating those of said information items associated with said family of categories and having properties matching said parameterized part of said parameterized category definition with parameter values for said parameterized part of said parameterized category definition, including dynamically creating said at least one search index by, at least in part, indexing said information items associated with said family of categories to determine which of said information items associated with said family of categories match said parameterized part of said parameterized category definition;
program code for obtaining a search query including an indication of said family of categories and parameter values for said parameterized part; and program code for determining, responsive to said indication of said family of categories, said parameter values of said parameterized part, and said at least one search index, which of said information items match said search query.

* * * * *